United States Patent [19]

Saito

[11] Patent Number: 4,602,299
[45] Date of Patent: Jul. 22, 1986

[54] RECORDING APPARATUS WITH DEVICE FOR DETECTING THE STATUS OF A RECORDING MEDIUM

[75] Inventor: Syuichiro Saito, Kanagawa, Japan

[73] Assignee: Canon Kabushiki Kaisha, Tokyo, Japan

[21] Appl. No.: 526,117

[22] Filed: Aug. 24, 1983

[30] Foreign Application Priority Data

Aug. 25, 1982 [JP] Japan ................................ 57-147289

[51] Int. Cl.[4] ...................... G11B 15/04; G11B 23/02; G11B 23/03; G11B 19/04
[52] U.S. Cl. ...................................... 360/60; 360/132; 360/96.6; 369/75.1
[58] Field of Search ............... 360/93, 96.5, 133, 96.6, 360/132, 60

[56] References Cited

U.S. PATENT DOCUMENTS

| 3,678,215 | 7/1972 | Kihara | 360/132 X |
| 3,702,907 | 11/1972 | Sato | 360/60 X |
| 3,721,772 | 3/1973 | Miura et al. | 360/132 |
| 3,766,327 | 10/1973 | Johnson et al. | 360/60 X |
| 3,817,539 | 6/1974 | Kawada et al. | 360/93 |
| 3,869,717 | 3/1975 | Kawada et al. | 360/60 |
| 4,084,200 | 4/1978 | Adair et al. | 360/60 X |
| 4,106,064 | 8/1978 | Hoshido | 360/60 |
| 4,320,424 | 3/1982 | Murayama | 360/96.6 X |
| 4,348,707 | 9/1982 | Maly et al. | 360/132 |

Primary Examiner—Raymond F. Cardillo
Assistant Examiner—Alyssa H. Bowler
Attorney, Agent, or Firm—Toren, McGeady, Stanger, Goldberg & Kiel

[57] ABSTRACT

A recording apparatus for use with a recording medium including a detecting device for detecting whether the recording medium is applicable for information recording and a preventing device responsive to the detecting device for preventing the recording medium from being loaded on a loading station when the recording medium is not applicable for information recording.

18 Claims, 6 Drawing Figures

RECORDING APPARATUS WITH DEVICE FOR DETECTING THE STATUS OF A RECORDING MEDIUM

BACKGROUND OF THE INVENTION

1. Field of the Invention

This invention relates to a recording apparatus.

2. Description of the Prior Art

Recording apparatuses of the kind using, for example, a magnetic recording medium permit use of the same recording medium over and again as information recorded on the recording medium is erasable. This advantage, however, tends to result in erroneous erasure of an important record of information or inadvertent overlapped recording on a recorded medium. To prevent such inconvenience, therefore, it has been generally the practice to provide some means for preventing erroneous recording or erasure on and audio recording tape cassette or a video recording tape cassette. In accordance with conventional practice, a recording circuit or a recording button is arranged to become inoperative when the erroneous recording or erasure preventing means is set, for example, by removing a pawl therefrom. When continuously recording sounds onto an audio recording tape or picture images onto a video recording tape, even if the condition inhibiting recording operation is established only on the brink of starting the recording operation, the inhibiting state does not seriously affect the recording operation. Whereas, in the case of recording, for example, a still picture, belated perception of the inhibiting state at the brink of recording would hinder the operator from securing a good recording opportunity.

SUMMARY OF THE INVENTION

A general object of the present invention is, therefore, to provide a novel recording apparatus which is capable of obviating the inconvenience of the prior art arrangement mentioned in the foregoing.

A more specific object of the invention is to provide a recording apparatus equipped with means for preventing loading and use of a recording medium container on the apparatus when the container has been set into an erroneous erasure or recording preventing condition.

To attain this object, an embodiment of this invention which will be further described herein is provided with detection means for detecting whether or not a recording medium container has been set into an erroneous recording or erasure preventing condition; and prevention means are provided for preventing loading and use of the recording medium container in response to the detection means.

Another object of the invention is to provide a recording apparatus having means for preventing the loading of a recording apparatus with a container containing a recording medium on which recording has already been effected to its full extent.

An embodiment of the invention arranged to attain this object is provided with detection means which detects whether or not recording has already been made on a recording medium to its full extent; and prevention means for preventing loading and use of the container containing the recording medium in response to the detection means.

A further object of the invention is to provide a recording apparatus equipped with a mechanism capable of preventing loading and use of both a container which contains a recording medium already recorded to its full extent and a recording medium container which is set in an erroneous recording or erasure preventing state.

An embodiment of the invention arranged to attain that object is provided with first detection means which detects whether or not a recording medium has already been recorded to its full extent; second detection means for detecting whether or not a recording medium container is in a state of having been set into an erroneous erasure preventing state; and prevention means for preventing loading and use of the above-stated recording medium container in response at least to one of the first and second detection means.

These and further objects and features of the invention will become apparent from the following detailed description of preferred embodiments thereof taken in conjunction with the accompanying drawings.

DETAILED DESCRIPTION OF PREFERRED EMBODIMENTS

Figure 1:
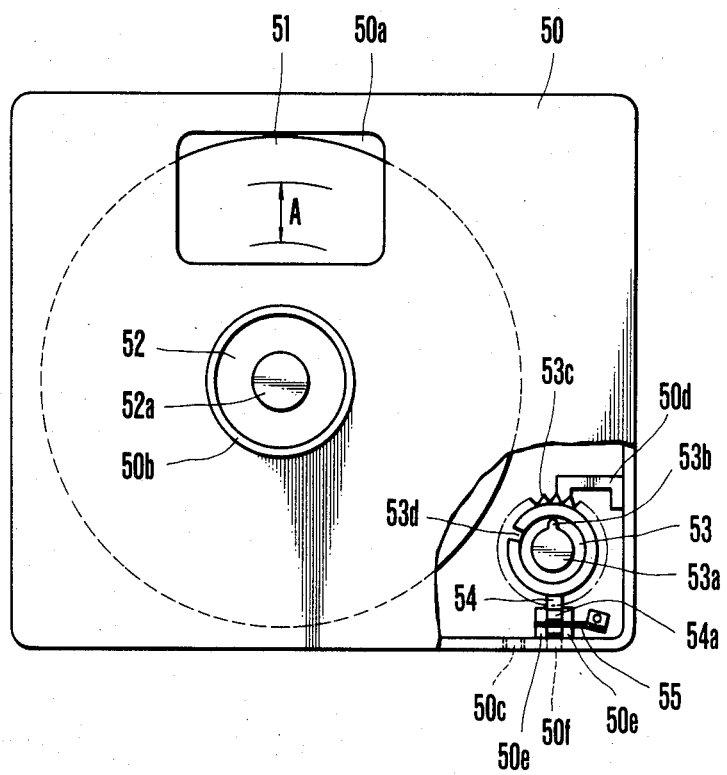
FIG. 1 a plan view partially broken away showing a magnetic sheet cassette as a specific example of recording medium containers usable for an embodiment of the invention.

Referring to FIG. 1 which shows a magnetic sheet containing cassette as a specific example of recording medium containers usable with an embodiment of the present invention, the cassette arrangement includes a magnetic sheet 51; a center hub 52 which is provided with a hole 52a in the middle thereof for fitting engagement with a rotary drive shaft of the recording apparatus; a cassette 50 which houses the magnetic sheet 51; an opening 50a of the cassette 50 arranged to allow a recording head of the recording apparatus to be inserted therein together with a stabilizing member, etc. provided for stable travel of the magnetic sheet 51; another opening 50b arranged to expose the center hub 52 to the outside; and a pawl 50c which serves as a recording or erasure inhibition setting member. The apparatus is allowed to record information or erase recorded information when this pawl 50c is attached to the body of the cassette 50, that is, when the cassette is set into an information recording or erasing operation permitting mode. However, when the cassette is set into a recording or erasing operation inhibiting mode by removing the pawl 50c, the apparatus is incapable of recording information or erasing recorded information when the apparatus is loaded with that cassette.

The cassette 50 is provided with a counter 53 which is a specific example of indicating means for showing a recorded track position. In cases where a magnetic sheet has recording tracks concentrically arranged thereon, the indicating means is arranged to show the number of tracks used for recording. The counter 53 is rotatively driven by the rotary drive shaft of the recording apparatus as the position of a recording head is shifted. Then, the number of recorded tracks is indicated by the phase of a key way 53b which is formed as a part of the shaft hole 53a. For example, the number of recorded tracks is indicated by the phase of the key way 53b in relation to a graduation arrangement provided on the outer surface of the cassette 50. The cassette 50 has a resilient pawl 50d which is arranged to engage a ratchet part 53c provided on the periphery of the counter 53 to bring it to a stop. The cassette 50 is further provided with a rotation inhibiting member 54. When the counter 53 comes to indicate that recording has been performed on the magnetic sheet 51 to the full extent thereof or covering all the recording tracks thus indicating a number obtained by adding 1 to a maximum number of tracks provided, the rotation inhibiting member 54 engages a recess 53d provided in the counter 53. This disables the counter 53 from rotating further. The inhibiting member 54 is arranged to be slidable up and down as viewed on the drawing along a pair of guides 50e provided on the cassette 50. The member 54 is urged to move upward as viewed on the drawing in the direction of engaging the counter 53 by a plate spring 55 which acts on the protrudent part of the member 54. Meanwhile, the cassette 50 is provided with an opening 50f which is formed in a position opposite to the tail end of the inhibiting member 54. The tail end of the inhibiting member 54 is located close to this opening 50f when the member 54 is not engaging the recess 53d of the counter 53. The protrudent part 54a of the member 54 protrudes from the outer surface of the cassette 50 to permit an operation thereon from outside of the cassette 50. Accordingly, the counter 53 is manually rotatable by operating this protrudent part 54a from outside to disengage the inhibiting member 54 from the recess 53d of the counter 53.

On the magnetic sheet 51, an area which is indicated by a reference symbol A is, for example, arranged to be usable as recording area. About 50 recording tracks, for example, are arranged within this area.

Figure 2:
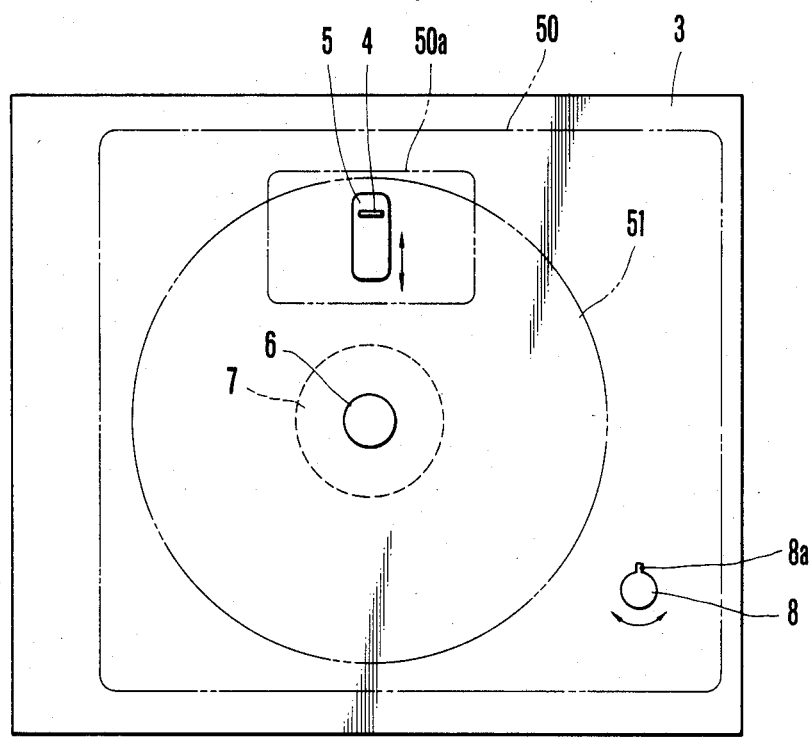
FIG. 2 is a plan view showing a recording apparatus and particularly the cassette loading section thereof as an embodiment of the invention using the recording medium container or cassette shown in FIG. 1.

Referring to FIG. 2, the recording apparatus includes a cassette loading station 3. This station includes a recording magnetic head 4, a magnetic sheet rotating drive shaft 6, a counter rotating drive shaft 8, etc. The magnetic head 4 is disposed on a head carrier 5. The head carrier 5 is arranged to move the magnetic head 4 within the opening 50a of the cassette 50 in the radial directions of the magnetic sheet 51 as indicated by arrows in the drawing. The counter drive shaft 8 is arranged to be insertable into the shaft hole 53a of the counter 53 and is provided with a key 8a which corresponds to the key way 53b. The counter 53 becomes drivable with this key 8a engaging the key way 53b. Further, the counter drive shaft 8 is arranged to be rotated in association with the movement of the head carrier 5 by some means not shown. The magnetic sheet rotating drive shaft 6 is arranged to engage the hole 52a provided in the center hub 52 of the magnetic sheet 51 and to be rotated by means of a motor 7.

Figure 3:
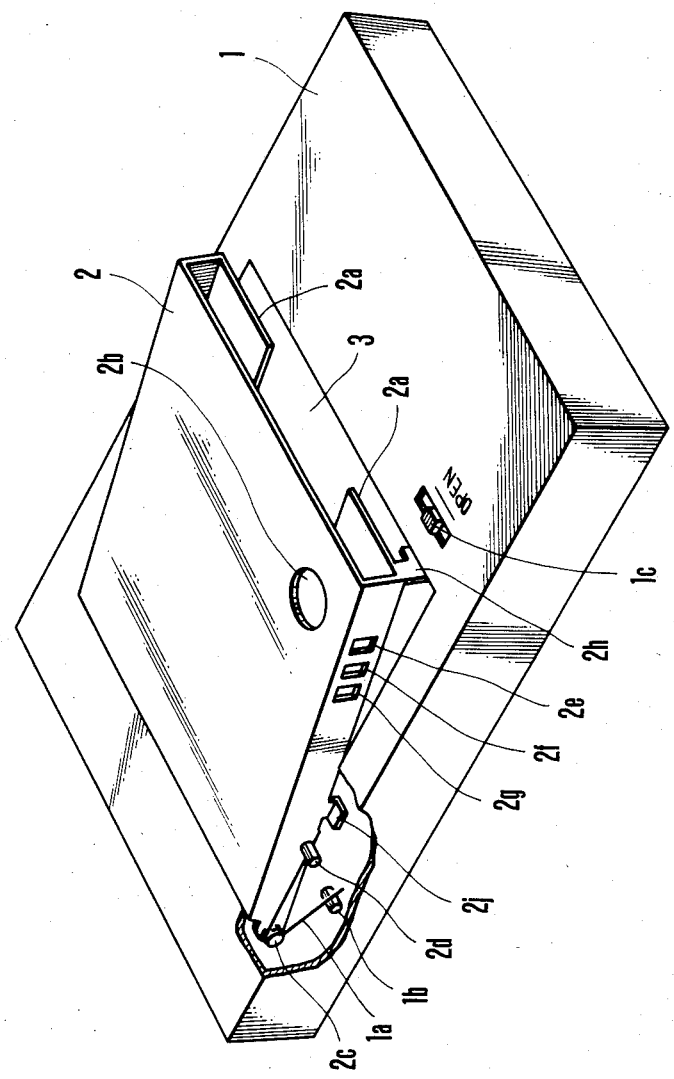
FIG. 3 is an oblique view showing the recording apparatus having a cassette receiving part thereof opened.

Referring to FIG. 3, a reference numeral 1 denotes the body of the recording apparatus and 2 denotes a cassette receiving part. The cassette receiving part 2 is shown open for enabling removal or loading of the cassette 50. The cassette receiving part 2 is provided with bent parts 2a which are arranged to carry the cassette 50; a counter window 2b which permits observation of the counter 53 of the cassette 50 through this window 2b; and a pivot 2c which permits the receiving part 2 to turn thereon in opening and closing. A spring 1a which is arranged around the pivot 2c urges the cassette receiving part 2 to turn counterclockwise as viewed on the drawing, i.e. in the opening direction. The body 1 is provided with a spring peg 1b while the cassette receiving part 2 is provided with another spring peg 2d. Further, the turning movement of the cassette receiving part 2 caused by the spring 1a in the opening direction is restricted to the illustrated posture by an engaging part 2j of the receiving part 2 and a fixed part of the body 1 which are arranged to engage with each other although the latter is not shown. The cassette receiving part 2 is further provided with a counter detecting window 2e; a window 2f for detecting the recording or erasing inhibiting pawl; and another window 2g for detecting a cassette. These windows are arranged in such positions as to permit a counter detection lever 9, a recording or erasing inhibiting pawl detection lever 13 and a cassette detection lever 17 to have their tips 9a, 13a and 17a insertable and retractable into and from these windows when the cassette receiving part 2 is closed on the body 1 into a stowed position. Further included in the cassette receiving part 2 is a hook part 2h which will be described later herein.

When the cassette receiving part 2 is closed onto the body 1 with a cassette 50 inserted therein, the cassette 50 is mounted on a cassette loading station 3 of the body 1. In that instance, the sheet rotating drive shaft 6 engages the shaft hole 52a of the center hub 52 of the magnetic sheet 51. The magnetic head 4 abuts upon the recording surface of the magnetic sheet 51. The counter drive shaft 8 enters the hole 53a of the counter 53.

The apparatus is provided with an operation knob 1c for opening the cassette receiving part 2 from the closed state by operating it in the direction of arrow as shown in the drawing.

Figure 4:
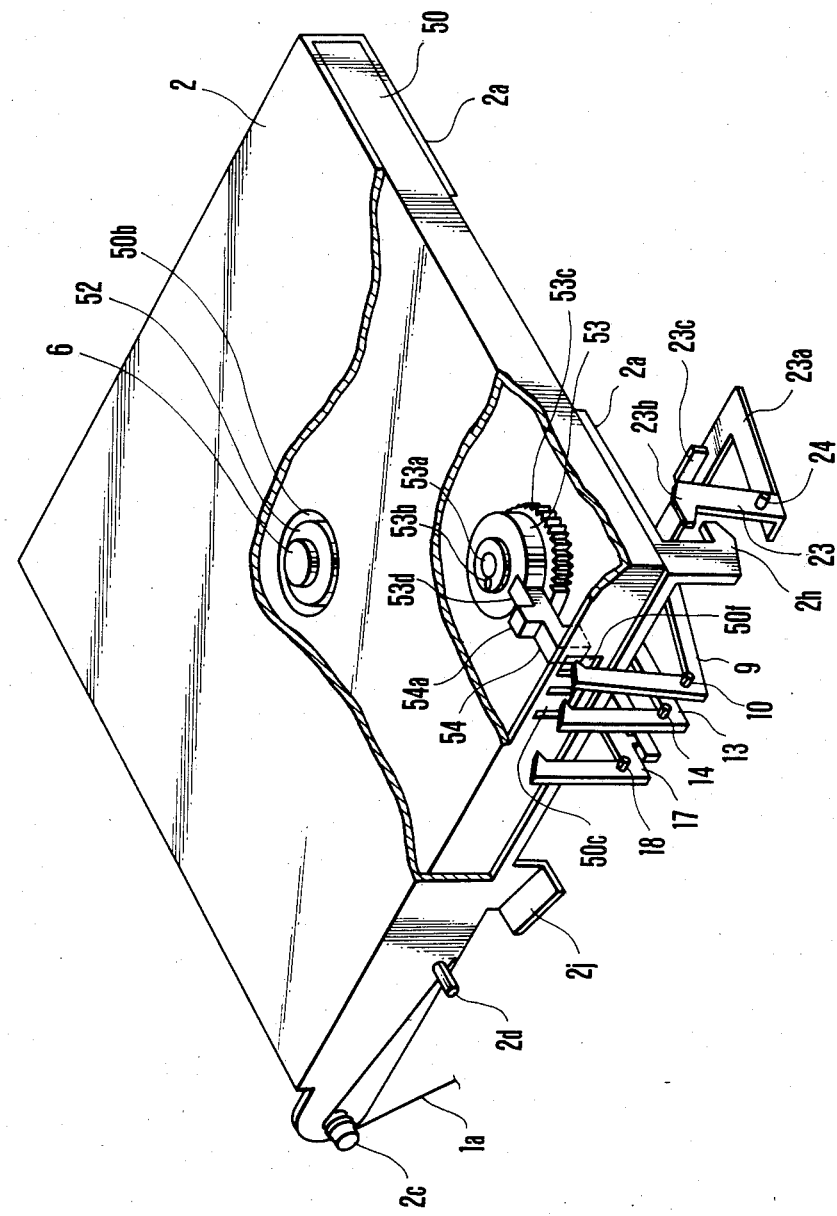
FIG. 4 is an oblique view showing the apparatus of FIG. 3 in an enlarged state and particularly showing the cassette loading control part thereof.
Figure 5:
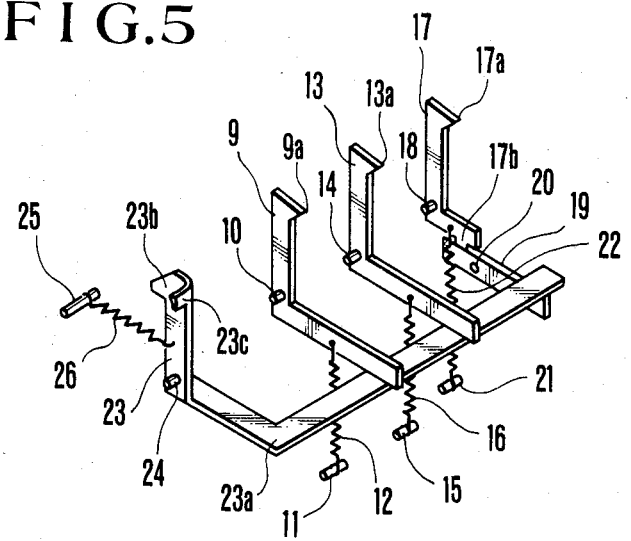
FIG. 5 is an enlarged oblique view showing the essential portion of the cassette loading control part shown in FIG. 4.

Referring now to FIGS. 4 and 5, the embodiment includes the above-stated counter detection lever 9 and the recording or erasing inhibiting pawl detection lever 13. These levers 9 and 13 are rotatably attached to the body 1 through shafts 10 and 14 respectively. They are respectively urged to turn clockwise as viewed on FIGS. 4 and 5 by means of springs 12 and 16 attached to pins 11 and 15 which are secured to the body 1 (see FIG. 5). The above-stated cassette detection lever 17 is rotatably attached to a shaft 18 which is provided on the body 1. A spring 22 which is arranged between the lever 17 and a pin 21 secured to the body 1 (FIG. 5) urges the cassette detection lever 17 to turn clockwise as viewed on FIGS. 4 and 5. The lever 17 is provided with a protrudent part 17b which abuts on a connection lever 19. The connection lever 19 is rotatably attached to a shaft 20 provided on the body 1. A lock lever 23 is provided with a lock claw 23b which is arranged to engage the hook part 2h of the cassette receiving part 2. The lever 23 is rotatably attached to a shaft 24 which is provided on the body 1. A spring 26 which is arranged between the lever 23 and a pin 25 secured to the body 1 urges the lock lever 23 to turn counterclockwise as viewed on FIGS. 4 and 5. The lock lever 23 is further provided with an arm part 23a which is arranged to abut upon the counter detection lever 9, the recording or erasing inhibiting pawl detection lever 13 and the cassette detection lever 17 respectively. Another arm part 23c of the lock lever 23 is extended and is connected to the operation knob 1c which is provided for opening the cassette receiving part 2 as shown in FIG. 3.

The forces of the springs 12, 16, 22 and 26 which are acting on the above-stated four levers 9, 13, 17 and 23 are arranged in the following manner: First, the springs 12 and 16 respectively have stronger acting force than the acting force of the spring 26. Meanwhile, the acting force of the spring 22 is stronger than a composite acting force of the springs 12 and 16.

With the embodiment arranged as described above, when the cassette receiving part 2 is closed on the body 1 of the apparatus without having any cassette 50 inserted therein, the tips 9a and 13a of the detection levers 9 and 13 encounter no obstacles. Therefore, the levers 9 and 13 attempt to turn clockwise due to the acting force of the springs 12 and 16. At that instance, however, the cassette detection lever 17 whose tip 17a is also not hindered by any cassette 50 is caused by the spring 22 to turn clockwise by prevailing over the acting forces of the springs 12 and 16. Then, the protrudent part 17b of the lever 17 pushes the connection lever 19 to turn it counterclockwise. This causes the lock lever 23 to turn counterclockwise to enable the lock claw 23b of the lock lever 23 to engage the hook part 2h of the cassette receiving part 2. As a result, the cassette receiving part 2 is locked in a closed state. In other words, when the cassette receiving part 2 is closed with no cassette 50 contained therein, the cassette detection lever 17 serves to ensure that the receiving part 2 is locked in a stowed condition within the body 1 of the apparatus.

To open the cassette receiving part 2 from this closed state, the operation knob 1c shown in FIG. 3 is operated in the direction of arrow. This causes the lock lever 23 to turn clockwise and thus to disengage the lock claw 23b from the hook part 2h of the cassette receiving part 2. Then, the spring 1a causes the receiving part 2 to turn counterclockwise until the engaging part 2j thereof comes to be restrained from moving further. As a result of that, there obtains the open condition of the cassette receiving part 2 as shown in FIG. 3

Next, when the cassette receiving part 2 is closed with the cassette 50 inserted therein, the embodiment operates as follows: The tip 17a of the cassette detection lever 17 is first pushed by one side of the cassette 50. This causes the lever 17 to turn counterclockwise against the force of the spring 22. As a result, the lock lever 23 comes to be under the control of the detection levers 9 and 13.

In this instance, if the cassette 50 thus loaded contains a magnetic sheet 51 which has not yet been recorded to its full extent and if the recording or erasing inhibiting pawl 50c has not been removed from the cassette 50, the detection levers 9 and 13 respectively come to have their tips 9a and 13a pushed by the tail end of the inhibiting member 54 and the inhibiting pawl 50c of the cassette 50. This causes them to turn counterclockwise against the forces of the springs 12 and 16. As a result, the spring 26 causes the lock lever 23 to turn counterclockwise. The lock claw 23b of the lever 23 comes to engage the hook part 2h of the cassette receiving part 2. The cassette receiving part 2 thus comes to be locked in a closed state to permit information recording on the magnetic sheet 51.

In case where the magnetic sheet 51 of the cassette 50 inserted in the cassette receiving part 2 has been recorded to its full extent, that is, where recording on the magnetic sheet 51 has been completed to the last recording track (or the 50th track), the inhibiting member 54 is located in the recess 53d of the counter 53. Therefore, the tip 9a of the cassette detection lever 9 is not blocked and the spring 12 causes the lever 9 to turn clockwise against the force of the spring 26. This in turn causes the lock lever 23 to turn clockwise to prevent the lock claw 23b from engaging the hook part 2h of the cassette receiving part 2. As a result of that, the cassette receiving part 2 is not locked to the body 1 and the spring 1a which is shown in FIGS. 3 and 4 brings the cassette receiving part 2 into the open state as shown in FIG. 3 when the part 2 is released from manual restraint. Any cassette that contains a completely recorded magnetic sheet 51 is thus prevented from being loaded and used on the recording apparatus.

In the case where a cassette 50 containing a magnetic sheet 51 which has not been recorded to the full extent thereof is loaded, the inhibiting member 54 enters the recess 53d due to the acting force of the plate spring 55 when the counter 53 comes to indicate a number such as "51" obtained by adding 1 to the maximum number of tracks with the magnetic head 4 shifted a little further then the last track after completion of recording on all the remaining tracks. With the inhibiting member 54 thus inserted into the recess 53d, the counter detection lever 9 turns clockwise as its tip 9a is no longer hindered. Then, this causes the lock lever 23 also to turn clockwise. The lock claw 23b of the lock lever 23 is disengaged from the hook part 2h of the cassette receiving part 2 to have the receiving part 2 automatically opened by virtue of the force of the spring 1a.

If a cassette 50 from which the recording or erasing inhibiting pawl 50c has been removed is inserted in the cassette receiving part 2, the tip 13a of the recording or erasing inhibiting pawl detection lever 13 is unblocked and the lever 13 is caused to turn clockwise by the spring 16 prevailing over the force of the spring 26. Then, this causes the lock lever 23 to turn clockwise. Therefore, the lock claw 23b does not engage the hook part 2h of the cassette receiving part 2 and the receiving part 2 is not locked to the body 1. The cassette 50 which has the recording or erasing inhibiting pawl 50c removed therefrom is thus prevented from being loaded and used on the recording apparatus.

While mechanical means is employed as detection means in the specific embodiment given in the foregoing, some optical means such as a photo-coupler or the like or a magnetic sensor or the like may be used for detecting all of or some of the counter, the recording or erasing inhibiting pawl and the cassette. In that instance, the control over the cassette receiving part locking means can be accomplished by operating some electromagnetic means with the light receiving part of the photo-coupler or with the output of the magnetic sensor.

In the case of the specific embodiment described above, when a cassette unsuited for recording is placed within the cassette receiving part, the cassette receiving part is disabled from being locked in a closed state on the body of the recording apparatus to inhibit the use of such a cassette. Meanwhile, in another embodiment example of the invention, the cassette receiving part is arranged to be inhibited from being closed on the recording apparatus body when it has such a cassette inserted therein.

Figure 6:
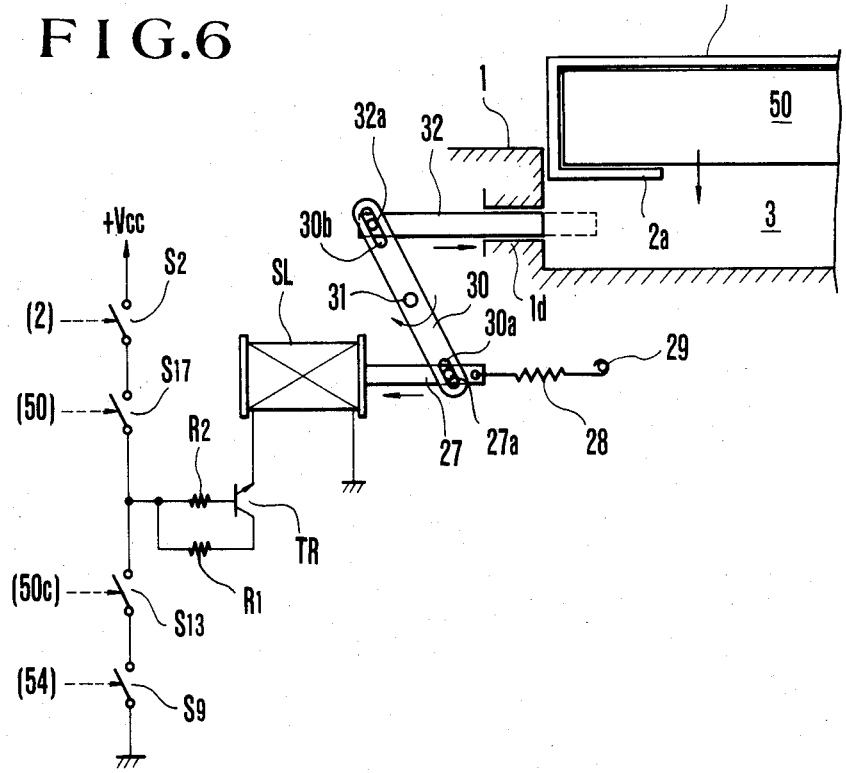
FIG. 6 is a schematic illustration of another embodiment showing essential parts of an arrangement differing from the arrangement of the preceding embodiment.

The above-stated another embodiment is arranged as shown in FIG. 6, which shows only the parts of the embodiment differing from the preceding embodiment. Parts not shown in FIG. 6 and particularly the parts of mechanical arrangement are arranged in the same manner as shown in FIGS. 4 and 5 with the exception that the three detection levers 9, 13 and 17 are omitted in this case.

Referring now to FIG. 6, the embodiment includes a cassette receiving part closure detection switch S2 which is arranged to close at the initial stage of turning movement of the cassette receiving part 2 in the closing direction; a cassette detection switch S17 which corresponds to the cassette detection lever 17 of the preceding embodiment and is arranged to close when the cassette 50 is placed inside the cassette receiving part 2; a recording or erasing inhibiting pawl detecting switch S13 which corresponds to the recording or erasing inhibiting pawl detection lever 13 of the preceding embodiment and is arranged to close when the recording or erasing inhibiting pawl 50c has not been removed from the cassette 50 placed inside the cassette receiving part 2; and a counter detection switch S9 which corresponds to the counter detection lever 9 of the preceding embodiment and is arranged to close when the inhibiting member 54 of the cassette 50 placed within the cassette receiving part 2 has not moved into the recess 53d of the counter 53. These switches are connected in series. The switch S2 is connected to a power source +Vcc while the switch S9 is connected to a circuit ground. All these detection switches S9, S13 and S17 are disposed within the cassette receiving part. There is provided an npn switching transistor TR which has its collector and base respectively connected to a connection point between the switches S17 and S13 via resistors R1 and R2. A reference symbol SL denotes a solenoid. One end of the coil of the solenoid SL is connected to the emitter of the transistor TR and the other end to the circuit ground. The solenoid SL is provided with an armature rod 27. A spring 28 urges the armature rod 27 to move in a protruding direction. A spring peg 29 is arranged for the spring 28. A turning lever 30 is pivotally carried by a shaft 31 to be rotatable on the shaft. The turning lever 30 is provided with a slot 30a which is formed in one end of the lever 30 and engages a pin 27a disposed on the armature rod 27. A cassette receiving part closure preventing lever 32 is slidably carried by a part 1d of the apparatus body 1 and is arranged to be insertable sidewise into the cassette loading station 3. This lever 32 engages a slot 30b formed in the other end of the turning lever 30 via a pin 32a which is provided on the tail end of the lever 32.

With the embodiment arranged as described above, when the cassette receiving part 2 is closed without having any cassette placed therein, the solenoid SL is not energized as the cassette detection switch S17 remains open even when the switch S2 closes at the initial stage of the closing operation on the cassette receiving part 2. Accordingly, the preventing lever 32 stays retracted from the cassette loading station 3 to allow the cassette receiving part 2 to be closed on the apparatus.

In case the cassette receiving part 2 is to be closed with the cassette 50 placed within the receiving part 2, if the inhibiting member 54 of the cassette 50 has not moved into the recess of the counter 53 (that is, the magnetic sheet 51 has not been recorded to its full extent) and also if the inhibiting pawl 50c has not been removed (that is, recording or erasing has not been inhibited), both the counter detection switch S9 and the inhibiting pawl detection switch S13 are closed. Therefore, the transistor TR is not energized even when switches S2 and S17 are closed. No power supply is then effected to the solenoid SL, so that the cassette receiving part 2 can be closed on the apparatus also in this case.

However, in the event that the inhibiting member 54 of the cassette 50 has moved into the recess 53d, of the counter 53 with the magnetic sheet 51 having been recorded to its full extent or that the inhibiting pawl 50c has been removed to inhibit recording or erasing, one of the switches S9 and S13 is opened. As a result, the transistor TR is energized when the switches S2 and S17 come to close. Then, power supply is effected to the solenoid SL. With power supply effected to the solenoid, the armature rod 27 is pulled in the direction of arrow as shown in the drawing against the force of the spring 28. This causes the turning lever 30 to turn clockwise. As a result of that, the preventing lever 32 is caused to slide in the direction of the arrow to have its tip move into the cassette loading station 3 as indicated by a broken line in the drawing. Therefore, the bent part 2a of the cassette receiving part 2 comes to collide against the tip of the preventing lever 32 to disable the cassette receiving part 2 from being closed.

Any cassette that is unsuitable for recording is thus prevented from being loaded and used on the recording apparatus.

While preferred examples of the invention are arranged in the manner as has been described in the foregoing, the invention is not limited to these embodiments. The arrangement to detect the phase of the counter, as described in the foregoing, in finding whether or not the magnetic sheet contained in the cassette has been already recorded to its possible full extent may be replaced with some different arrangement in which, for example, all the recording tracks are scanned with a reproducing head and whether the magnetic sheet has been recorded to its full extent or not is determined according to the presence or absence of a reproduction signal resulting from the scanning. In that instance, the result of detection may be stored by storage means and then, for example, the locking operation of the lock lever on the cassette receiving part which has been described with reference to FIGS. 3-5 may be controlled by the output of the storage means.

In the embodiments described, a magnetic sheet is used as the recording medium. However, the invention is also adequately applicable to apparatuses of different kinds using, for example, optical discs or tape shaped recording media such as a magnetic tape, etc.

While the cassette receiving part of the embodiments described is arranged to be turnable relative to the body of the recording apparatus, the cassette receiving part may be arranged to be slidable instead of arranging it to be rotatable.

It is thus to be understood that various modifications may be made in the embodiments described within the scope of the following claims.

What I claim:

1. A recording apparatus for use with a recording medium housed in a cassette, said cassette having means for indicating recording inhibition, said apparatus comprising:

a cassette loading station for loading thereon said cassette;

preventing means responsive to said recording inhibition indicating means of said cassette for preventing the cassette from being loaded on said cassette loading station when said recording inhibition indicating means is set to indicate recording inhibition;

cassette receiving means for receiving therein said cassette, said receiving means being movable to a predetermined position to load the cassette on said cassette loading station; and latching means for latching said cassette receiving means at said predetermined position;

wherein said preventing means is arranged to disable said latching means when said recording inhibition indicating means of said cassette is set to indicate recording inhibition.

2. The apparatus according to claim 1, wherein said recording inhibition indicating means of the cassette includes an opening formed on the cassette and wherein said preventing means is responsive to the presence of said opening on said cassette.

3. The apparatus according to claim 2, wherein said preventing means includes a detector for detecting said opening on said cassette.

4. The apparatus according to claim 1, wherein said cassetee receiving means is arranged to be pivotable relative to said cassette loading station.

5. The apparatus according to claim 1, wherein said cassette receiving means is arranged to be slidable relative to said cassette loading station.

6. A recording apparatus for use with a recording medium housed in a cassette, said cassette having means for indicating recording inhibition, said apparatus comprising:

a cassette loading station for loading thereon said cassette;

preventing means responsive to said recording inhibition indicating means of said cassette for preventing the cassette from being loaded on said cassette loading station when said recording inhibition indicating means is set to indicate recording inhibition; and cassette receiving means for receiving therein said cassette, said receiving means being movable to a predetermined position to load the cassette on said cassette loading station;

wherein said preventing means is arranged to inhibit said cassette receiving means for moving to said predetermined position when said recording inhibition indicating means to said cassette is set to indicate recording inhibition.

7. The apparatus according to claim 6, wherein said recording inhibition indicating means of the cassette includes an opening formed on the cassette and wherein said preventing means is responsive to the presence of said opening on said cassette.

8. The apparatus according to claim 7, wherein said preventing means includes a detector for detecting said opening on said cassette.

9. The apparatus according to claim 6, wherein said cassette receiving means is arranged to be pivotable relative to said cassette loading station.

10. The apparatus according to claim 6, wherein said cassette receiving means is arranged to be slidable relative to said cassette loading station.

11. A recording apparatus for use with a recording medium housed in a cassette, said cassette having indication means for indicating that said recording medium is recorded with signals to its fullest possible extent, said apparatus comprising:

a cassette loading station for loading thereon said cassette;

preventing means responsive to said indication means of said cassette for preventing the cassette from being located on said cassette loading station when said indication means is indicating that said recording medium is recorded with signals to its fullest possible extent;

cassette receiving means for receiving therein said cassette, said receiving means being movable to a predetermined position to load the cassette on said cassette loading station; and latching means for latching said cassette receiving means at said predetermined position;

wherein said preventing means is arranged to disable said latching means when said indication means of said cassette is indicating that the recording medium is recorded with signals to its fullest possible extent.

12. The apparatus according to claim 11, wherein said cassette receiving means is arranged to be slidable relative to said cassette loading station.

13. The apparatus according to claim 11, wherein said preventing means includes a detector for detecting whether said indication means is indicating that the recording medium is recorded with signals to its fullest possible extent.

14. The apparatus according to claim 11, wherein said cassette receiving means is arranged to be pivotable relative to said cassette loading station.

15. A recording apparatus for use with a recording medium housed in a cassette, said cassette having indication means for indicating that said recording medium is recorded with signals to its fullest possible extent, said apparatus comprising:

a cassette loading station for loading thereon said cassette;

preventing means responsive to said indication means of said cassette for preventing the cassette from being loaded on said cassette loading station when said indication means is indicating that said recording medium is recorded with signal to its fullest possible extent; and cassette receiving means for receiving therein said cassette, said receiving means being movable to a predetermined position to load the cassette on said cassette loading station;

wherein said preventing means is arranged to inhibit said cassette receiving means from moving to said predetermined position when said indication means of said cassette is indicating that the recording medium is recorded with signals to its fullest possible extent.

16. The apparatus according to claim 15, wherein said preventing means includes a detector for detecting whether said indication means is indicating that the recording medium is recorded with signals to its fullest possible capacity.

17. The apparatus according to claim 15, wherein said cassette receiving means is arranged to be pivotable relative to said cassette loading station.

18. The apparatus according to claim 15, wherein said cassette receiving means is arranged to be slidable relative to said cassette loading station.

* * * * *